June 10, 1952 C. S. GRIFFIN 2,599,824
ADJUSTABLE CARRIER DEVICE
Filed Dec. 11, 1948 3 Sheets-Sheet 1
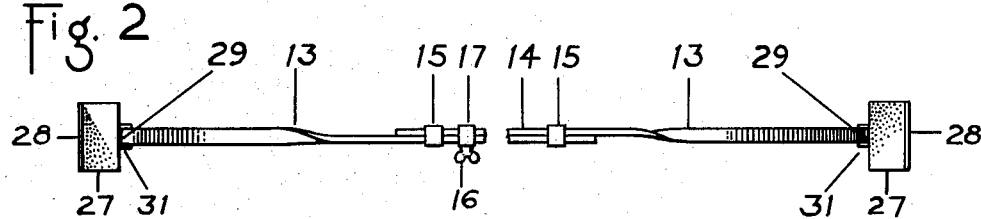
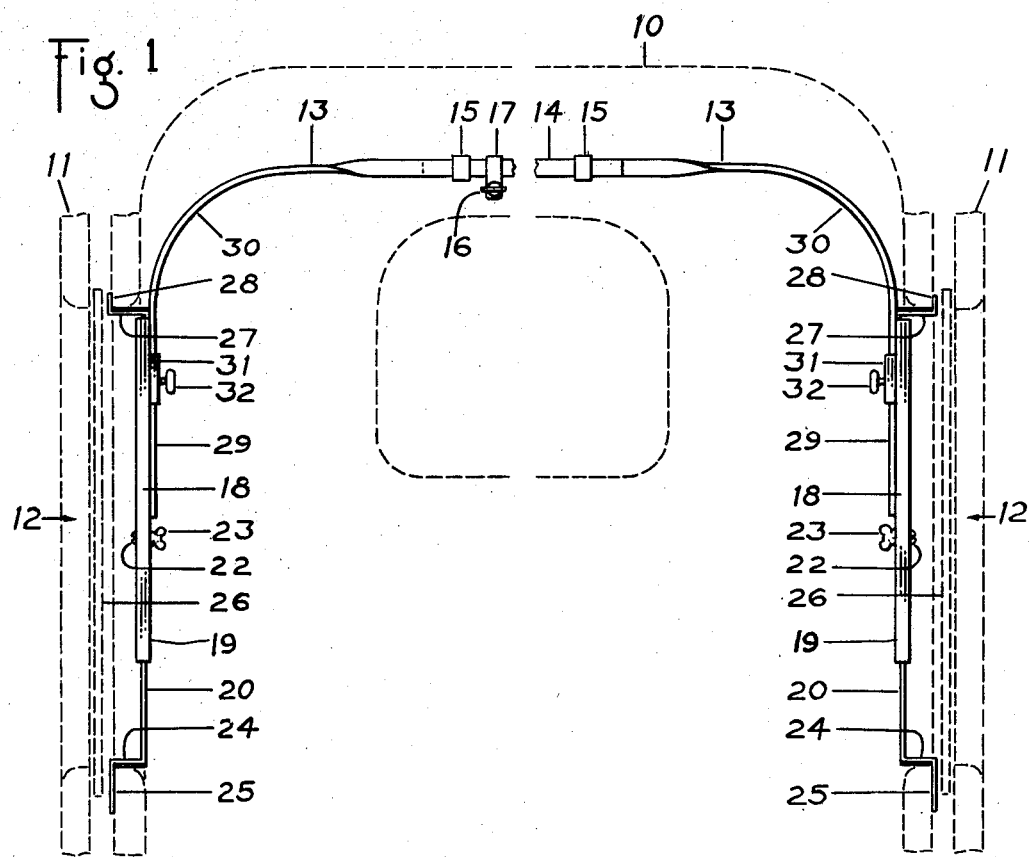
CHARLES S. GRIFFIN
INVENTOR.

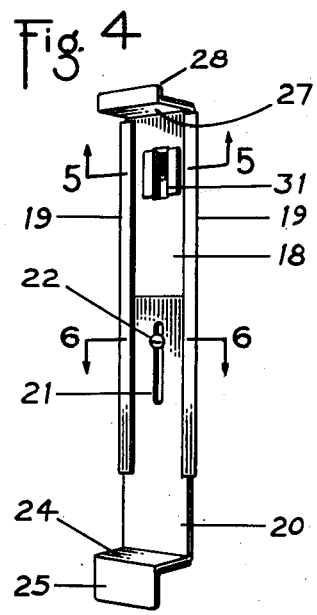
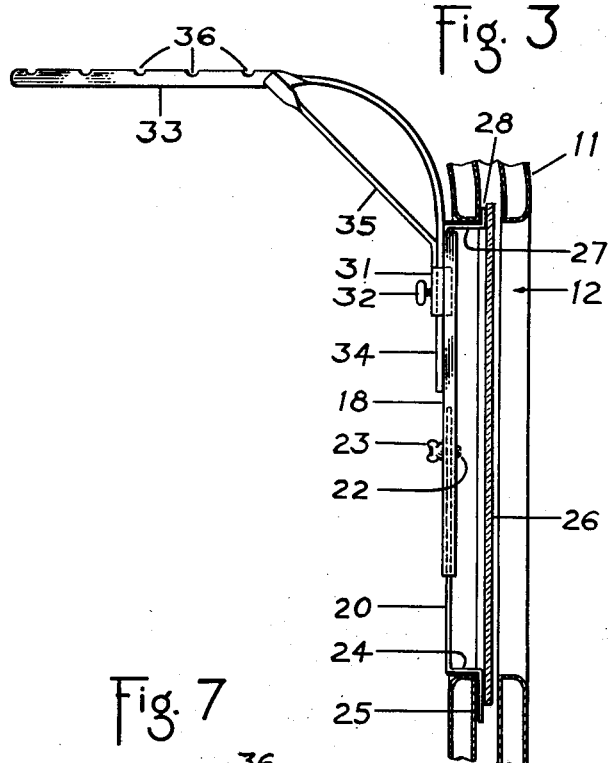
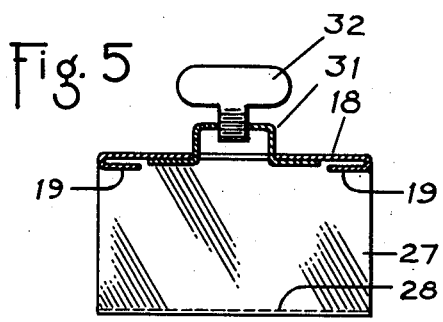
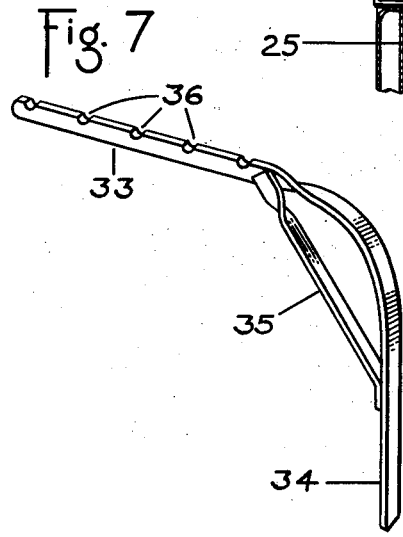
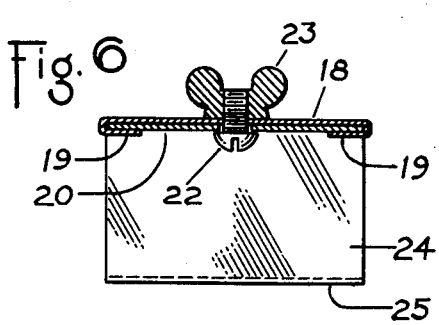
CHARLES S. GRIFFIN
INVENTOR.

June 10, 1952
C. S. GRIFFIN
2,599,824
ADJUSTABLE CARRIER DEVICE
Filed Dec. 11, 1948
3 Sheets-Sheet 3
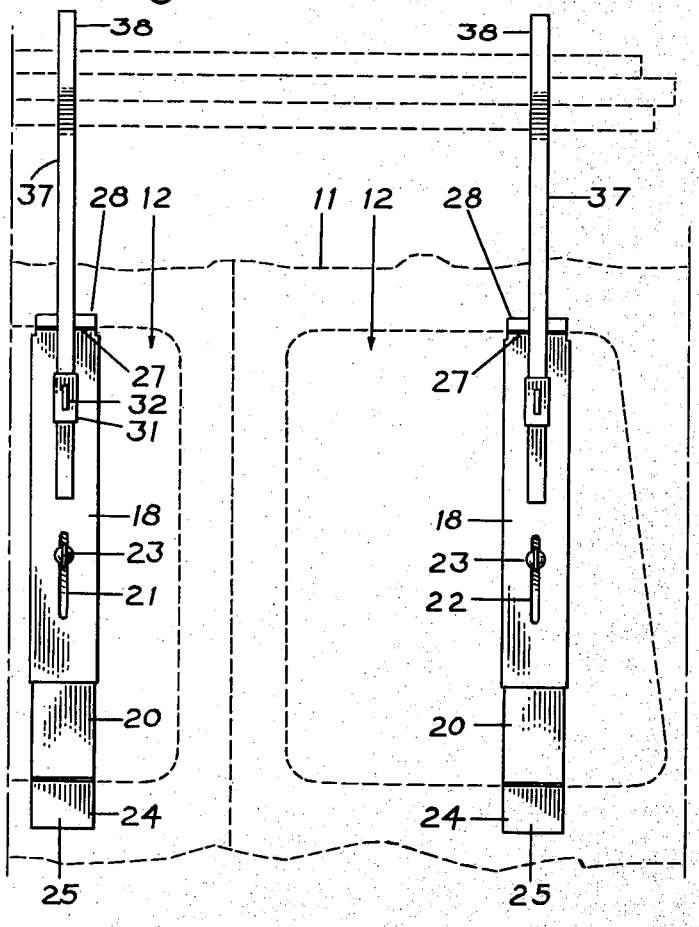
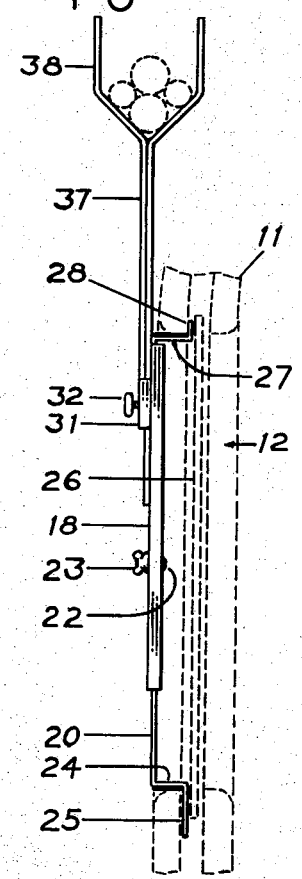
CHARLES S. GRIFFIN
INVENTOR.
BY G. Lorenze Miller Patented June 10, 1952

2,599,824

UNITED STATES PATENT OFFICE 2,599,824

ADJUSTABLE CARRIER DEVICE

Charles S. Griffin, Memphis, Tenn.

Application December 11, 1948, Serial No. 64,767

3 Claims. (Cl. 211—87)

This invention relates to carrier devices and more particularly to such devices especially provided and adapted for mounting within or upon a motor vehicle, such as, for example, a regular automobile or like vehicle not already so equipped.

The main object is to produce a simple yet appreciably practical and highly efficient device of adjustable character so as to be readily applied interchangeably to vehicles of different sizes and structural details, for carrying conveniently and with dependability, either on the inside or the outside of the vehicle, as may be necessary or desirable, various articles, items or things from time to time or as occasion may require.

Other objects and advantages to be attained will hereinafter more fully and clearly appear in the following description.

A practical but non-limiting structural adaptation of the invention is illustrated in the accompanying drawings, wherein:

Figure 1 is an elevational view of one form of the device as assembled and applied for use interiorly of an automobile body, the parts of the device itself being shown in full lines and the directly associated and adjacent parts of the vehicle body being shown in dotted lines;

Figure 2 is a top plan view of the assembled device alone and detached from the vehicle body;

Figure 3 is a side elevation of a modified form of the invention, the device being indicated as a single-armed bracket and applied only at one side of the vehicle body instead of comprising a full cross-frame extending from side to side of the vehicle body as shown in Figure 1;

Figure 4 is a perspective view of the adjustable upright holder element alone and detached, but which in use is attached to the window portion of the vehicle body;

Figure 5 is a cross section, on an enlarged scale to show more clearly the details of structure, the section being taken on the line 5—5 of Figure 4;

Figure 6 is a section on the line 6—6 of Figure 4;

Figure 7 is a perspective view of the rightangularly armed suspension member that is used as shown in Figure 3 but is here shown detached from the upright holder element by which it, in use, is mounted on the vehicle;

Figure 8 is a side elevational view of another modified adaptation of the invention where a pair of supports are attached at one side of the vehicle body for the carrying of various elongated items such as ordinary poles, fishing rods, and the like, the carried items and the adjacent parts of the vehicle body where the device is mounted being shown in dotted lines and the device itself being illustrated in full lines; and Figure 9 is a view taken at a right angle to the showing in Figure 8.

Referring now to the drawings in detail and first more particularly to the adaptation of the invention shown in Figures 1 and 2, the numeral 10 designates, schematically, the lining of the top portion of an ordinary automobile body and 11 a fragmentary showing of the opposite upper side wall portions of the body in the region of the window openings 12 thereof. These parts are of the regular conventional and obvious construction and arrangement and not in themselves a part of the present invention. Hence, the same are merely indicated in dotted lines, while the device of the present invention now to be described is, in distinction, shown in full lines.

The device of this particular adaptation of the invention is provided to span across the interior of the automobile body near the top thereof. As shown, it comprises a pair of horizontal elongated arms 13 whose meeting end portions overlap in lengthwise slidable relation, as at 14, for extension and contraction in adjustment, said end portions being retained against separation transversely by a pair of slidably fitted, sleeve-like clip members 15 and fastened releasably in adjusted relation by a set-screw 16 working in a third clip member 17 and tightenable to clamp and bind the parts together.

Each of the arms 13 extends rightangularly from the upper member 18 of an upright holder element which is mountable on the side of the automobile body. As shown, this member 18 has channeled vertical edge portions 19 in which the plain, straight, corresponding edge portions of a companion lower member 20 are slidably fitted. The member 20 (see Figure 4) is provided with a longitudinal slot 21, through which a headed screw-stud 22 is inserted into an aperture provided in the upper member 18 and receives on its projected end a wing-nut 23 (see Figure 6) by which the two holder members 18 and 20 are tightened releasably in lengthwise adjustment relative to each other.

As shown (see Figure 4 for clarity) the lower end portion of the lower holder member 20 is turned at a right angle, as at 24, to provide a shoulder so as to rest on the lower edge of a window opening 12 of the automobile body, while the extreme end portion 25 of said member 20 is rebent to provide an offset retainer flange or lug to project downward inside the wall 11 which is usually interiorly spaced in the region of the window opening for the accommodation of the customarily provided slidably glass window closure element 26.

At the upper end of the upper holder member 18 is an out-turned shoulder portion 27 similar to the portion 24 of the lower member 20, and at the extreme end of said member 18 is a retainer part 28 similar to the flange or lug 25.

It is here noted that the members 18 and 20 are made of a comparatively thin gauge but appreciably stiff and form-retentive metal so that the flange or lug portions 25 and 28 of the holder element parts 20 and 18 fit easily yet snugly in the limited space between the glass closure element 26 of the window opening 12 and the opposed side wall portion. In this connection it is further noted that, as shown, the upper flange or lug portion 28 is somewhat shorter than the lower flange or lug portion 25, as less length is needed for said upper portion 28 in its retentive effect for the holder element when applied to the side wall 11. It is still further noted that the upper member 18 and lower member 20 are readily adjusted and secured in place by loosening the nut 23, adjusting the parts 18 and 20, and then re-tightening the nut after the parts are positioned on the side wall 11. Obviously, the holder element is as easily removed.

The arms 13, as shown, are not integral extensions of the holder members 18, but, if so desired, they may be formed as directly extended integral parts of or be welded, riveted or otherwise fixedly fastened to said holder members. As shown (see Figure 1) the arms 13 are formed with down-turned, rightangular, outer end extensions 29, preferably with appreciable corner curvature 30, although the bend may be made with rather acute angularity at the corner. The angular end portion 29 of each arm 13 is inserted longitudinally adjustable in a rectangularly looped, strap-like bracket 31 formed on or attached to upper part of said upper holder member 18 (see Figures 4 and 5 for more specific details) and the portion 29 is fastened releasably in its adjusted position by a set-screw 32 provided for the purpose on the bracket 31.

The device thus described may be obviously adjusted to suit the width of the interior of an automobile body and also to raise or lower the arms 13 as may be desired, and, in use, the arms 13 may support, for example, a bassinet or the like containing a child, or, obviously, be used for numerous other purposes, such as the suspension of articles of clothing placed on the usual hangers suspended from said arms. This particular adaptation of the invention is usable to especial advantage in so many instances where a traveler is required to take along several changes of clothing and other items, and the clothing, in particular, ordinarily would have to be placed in suit cases or piled directly into the trunk of a car and easily become wrinkled. That is to say, by the use of the device of the present invention the articles may be distributed in suspension entirely across the car body above the rear seat if the latter is not otherwise to be occupied.

In some instances, where it is not feasible or desirable to extend the device of the present invention entirely across from side to side of the automobile body, individual suspension arms 33, separate from each other, may be mounted on opposite side walls or on one of the walls only (see Figure 3 for illustration of mounting and Figure 7 for detail form of the supension member alone).

In this adaptation of the invention the single arm 33 has a right angular stem 34 at one end to enter supportedly in the looped bracket 31 on the upper member 18 of the holder element. In this modification the arm 33 is braced to the stem 34 by a diagonal stay 35 which is welded or otherwise securely fastened to said parts 33 and 34. As shown, the arm 33 is provided with notches 36 in its upper edge to receive garment hangers and the like and thus hold them from sliding out of place on the arm.

Another modification of the invention is shown in Figures 8 and 9. In this modification a pair of separate holder elements, including the upper member 18 and lower member 20 hereinbefore described, are mounted in window openings 12 at one side of the car for supporting, either inside or outside the car body, a pair of vertical carrier elements 37, each comprising an elongated stem or shank portion which is received and fastened releasably and vertically adjustable in the looped bracket 31 of the upper holder member 18. At the upper end of each vertical stem or shank portion 37 is a bifurcated or branched, substantially U-shape portion 38 to receive and support an elongated article, such as, for example, a fishing pole, ordinary rod or bar, or like item, or a plurality of such items laid flat horizontally and supported adjacent their opposite ends by and between said pair of bifurcated or branched portions 38. The carrier provision of this last described modification is designed more particularly for carrying items on the outside of the vehicle, but, of course, the same may be mounted for carrying items inside.

In all adaptations of the invention the holder elements and their provision for mounting in the window openings of the car may be and usually are identically alike, the only difference being in the form of the suspension or carrier elements that are supported on said holder elements.

Further modification of the invention is possible. Hence, the invention is not limited to the specific constructions and arrangements of the adaptations illustrated in the accompanying drawings.

What is claimed is:

1. In a carrier device of the character described, an upright holder element comprising a vertical lower member having a laterally projected shoulder at its lower end to rest supportingly on the bottom horizontal edge of a window frame in the side wall of a motor vehicle body, with longitudinal retainer flange projected from said shoulder to engage the adjacent wall portion to hold the lower holder member in place and a vertical upper holder member releasably secured to said lower holder member in vertically adjustable relation thereto, said upper holder member having a stop shoulder at its upper end to abut the top horizontal edge of the window frame and a longitudinal flange projected from said stop shoulder to engage the adjacent wall portion to retain the holder element in place, and an item support having a vertical stem portion mounted supportedly vertically adjustable on said vertical upper holder member.

2. A carrier device as set forth in claim 1, wherein the item support has a horizontal arm extending from its stem portion for suspending items therefrom.

3. A carrier device as set forth in claim 1, wherein the item support has a horizontal arm extending from its stem portion for suspending items therefrom and a pair of such item supports mounted one each on opposite window frames of the vehicle body by means of said holder members, and the meeting ends of the respective horizontal arms are fastened releasably together against both transverse and longitudinal movement relative to each other.

CHARLES S. GRIFFIN.

REFERENCES CITED

The following references are of record in the file of this patent:

UNITED STATES PATENTS

| Number | Name | Date |
|---|---|---|
| 698,272 | Glover | Apr. 22, 1902 |
| 1,852,650 | Halberstadter | Apr. 5, 1932 |
| 1,861,341 | Grame | May 31, 1932 |
| 1,908,450 | Rutherford | May 9, 1933 |
| 2,253,423 | Fellers et al. | Aug. 19, 1941 |
| 2,266,294 | Allerdice | Dec. 16, 1941 |
| 2,270,796 | Hauser | Jan. 20, 1942 |
| 2,291,870 | Blair et al. | Aug. 4, 1942 |
| 2,299,674 | Austin, Jr. | Oct. 20, 1942 |
| 2,302,300 | Davies | Nov. 17, 1942 |
| 2,367,256 | Atkins | Jan. 16, 1945 |
| 2,405,701 | Lange | Aug. 13, 1946 |
| 2,425,629 | Mayer | Aug. 12, 1947 |
| 2,474,513 | Behrens | June 28, 1949 |